No. 619,961.  Patented Feb. 21, 1899.
P. P. HOGUE & R. C. JACK.
INJECTOR.
(Application filed Aug. 18, 1897. Renewed Jan. 7, 1899.)

(No Model.)

Witnesses:
F. L. Ourand.
J. L. Coombs.

Inventors:
Parker P. Hogue
Robert C. Jack,
by Laws Bagger & Co.
Attorneys

UNITED STATES PATENT OFFICE.

PARKER PILLSBURY HOGUE AND ROBERT CARNAHAN JACK, OF CINCINNATI, OHIO, ASSIGNORS TO ETTA MAY HOGUE, OF SAME PLACE.

INJECTOR.

SPECIFICATION forming part of Letters Patent No. 619,961, dated February 21, 1899.

Application filed August 18, 1897. Renewed January 7, 1899. Serial No. 701,523. (No model.)

*To all whom it may concern:*

Be it known that we, PARKER PILLSBURY HOGUE and ROBERT CARNAHAN JACK, citizens of the United States, and residents of Cincinnati, in the county of Hamilton and State of Ohio, have invented certain new and useful Improvements in Injectors; and we do hereby declare that the following is a full, clear, and exact description of the invention, which will enable others skilled in the art to which it appertains to make and use the same, reference being had to the accompanying drawings, which form a part of this specification.

Our invention relates to injectors for steam-boilers; and its object is to provide an improved construction of the same by means of which when the injector is working with a water-supply at a lower level and the supply is cut off a valve will be automatically opened, allowing the water to go back to its level and thus prevent freezing in cold weather.

The invention consists in the novel construction and combination of parts hereinafter fully described and claimed.

Figure 1:
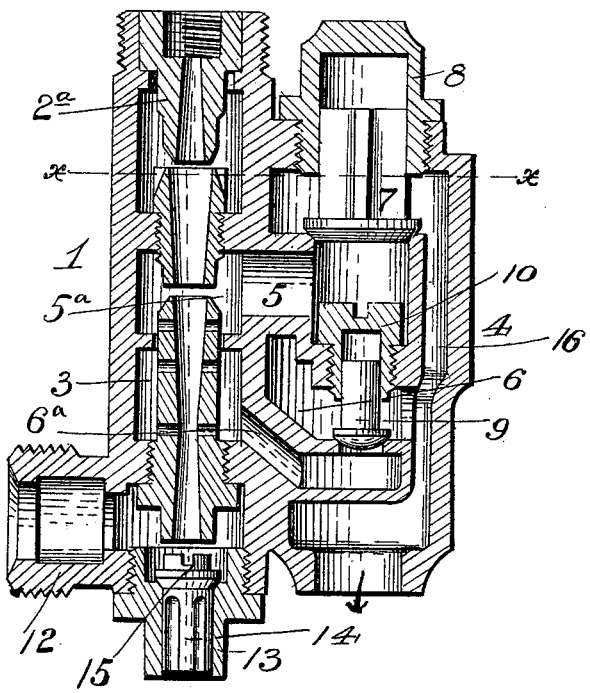
Figure 2:
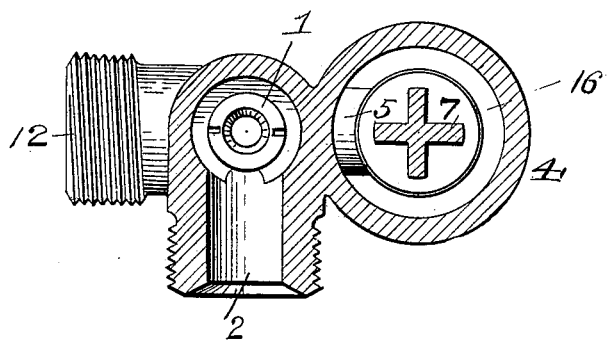

In the accompanying drawings, Figure 1 is a central longitudinal sectional view of an injector constructed according to our invention. Fig. 2 is a section on the line $xx$, Fig. 1.

In the said drawings the reference-numeral 1 designates the barrel of the injector, having an opening 2 near the upper end for the feed-water supply and an opening near the lower end leading to the boiler. The numeral $2^a$ designates the steam jet or tube, and 3 the combining and delivery tube. Formed with said barrel is the overflow-barrel 4, formed with two exhaust-chambers 5 and 6. The chamber 5 communicates with said main body of the injector by a passage $5^a$, while chamber 6 communicates with said main body by a passage $6^a$. The chamber 5 at the upper side is provided with a gravity wing-valve 7, which works in an opening in a screw-threaded plug 8 at the upper end of the overflow-barrel. The chamber 6 is provided with a valve 9, which works in an opening in a screw-threaded plug 10 in the lower side of the chamber 5. The said chambers 5 and 6 are vacuum-chambers, and the valves are closed during the working of the injector and held to their seats by atmospheric pressure.

The numeral 12 designates the feed-opening to the boiler, and 13 designates a screw-plug in the lower end of the barrel 1, formed with a central opening, in which is seated a gravity wing-valve 14, formed with a diametric slot 15 in its upper end. If the injector is connected with a water-supply at a lower level or below the injector, when the supply is shut off it will tend to cause a vacuum in the barrel 1, causing said valve 14 to rise, allowing the water to go back to its level and preventing freezing in cold weather and any steam from a leaky valve escaping at valves 7 and 9. Said valve 14 when raised stops against the end of the combining-tube and allows water to drain out of the latter through the slot in the end, and when the injector is at work it is seated by the pressure in the barrel.

The valves 7 and 9 are located one above the other, and the plug 10 serves the double purpose of closing chamber 6 and as a guide for valve 9. By this construction we also gain important advantages with respect to facility in manufacturing.

The numeral 16 designates the channels through which the steam escapes from chambers 5 and 6.

Having thus fully described our invention, what we claim is—

1. In an injector, the combination with the barrel, the jet-tube, the combining and delivering tube, of the overflow-barrel formed with two vacuum-chambers, the screw-threaded plugs and the valves located one above the other working in said plugs, substantially as described.

2. In an injector, the combination with the barrel, the jet-tube and the combining-tube, of the screw-threaded plug located in the lower end of said barrel and having a central recess and the wing-valve having a slot in its upper end and adapted when raised to abut or stop against the end of the combining-tube, substantially as described.

In testimony that we claim the foregoing as our own we have hereunto affixed our signatures in presence of two witnesses.

PARKER PILLSBURY HOGUE.
ROBERT CARNAHAN JACK.

Witnesses:
O. H. DICKMAN,
A. KRUG.